Dec. 2, 1958 K. BERGER 2,862,730
SPRING-LOADED UNIVERSAL JOINT FOR CONDUITS
Filed Jan. 11, 1955 2 Sheets-Sheet 1
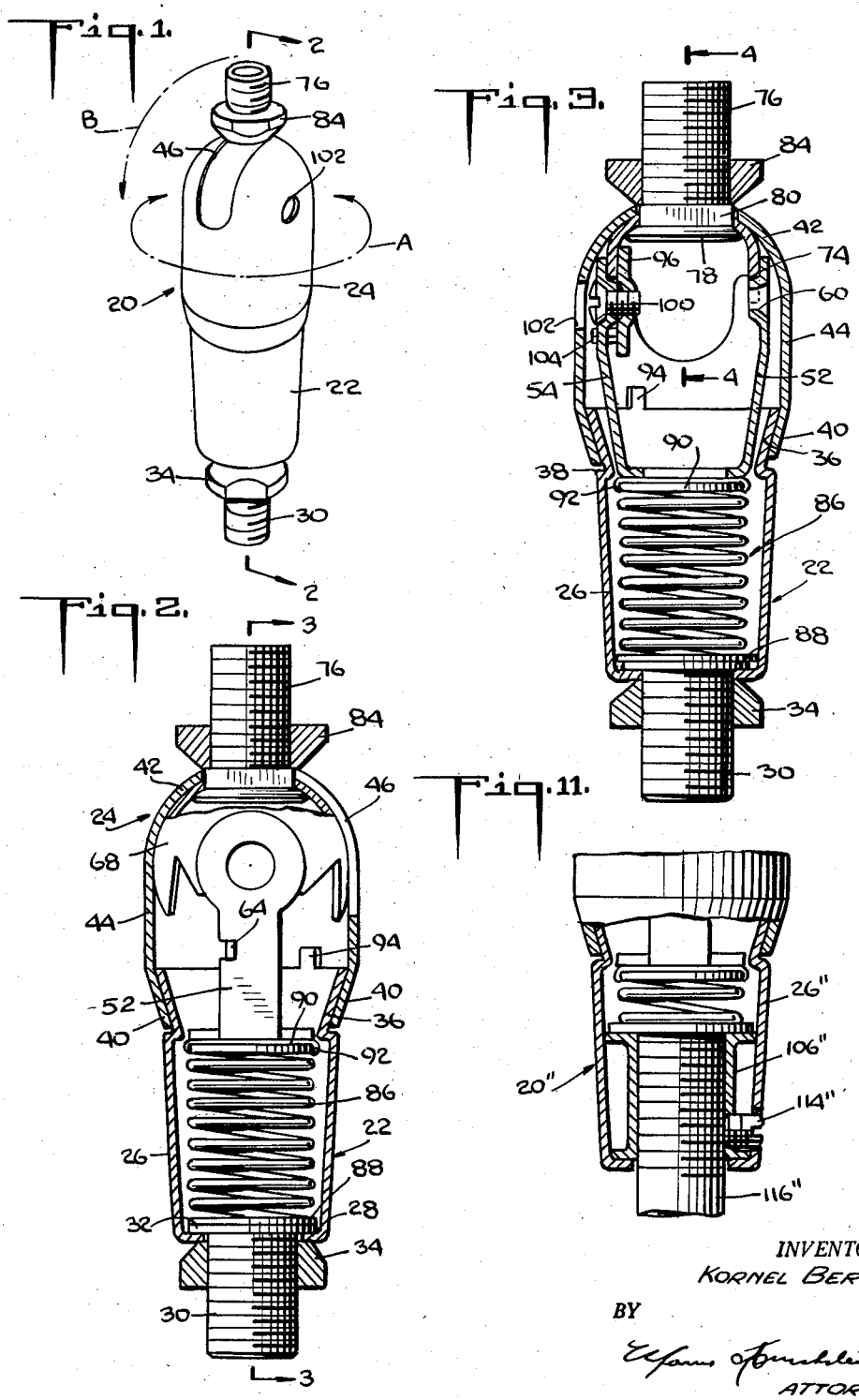
INVENTOR.
KORNEL BERGER
BY
ATTORNEY Dec. 2, 1958    K. BERGER    2,862,730
SPRING-LOADED UNIVERSAL JOINT FOR CONDUITS
Filed Jan. 11, 1955    2 Sheets-Sheet 2
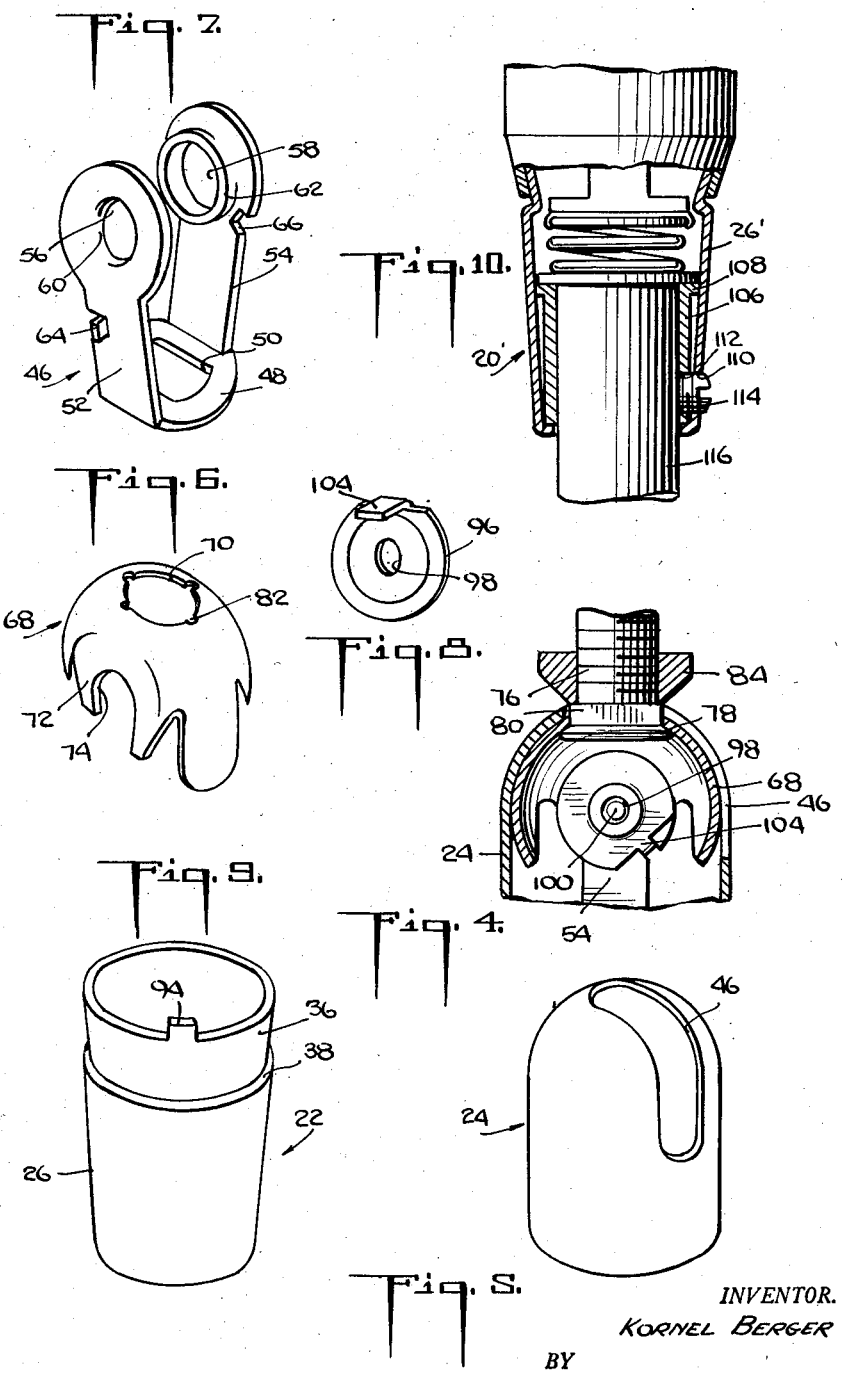
INVENTOR.
KORNEL BERGER
BY
ATTORNEY

United States Patent Office 2,862,730
Patented Dec. 2, 1958

2,862,730

SPRING-LOADED UNIVERSAL JOINT FOR CONDUITS

Kornel Berger, Kew Gardens, N. Y.

Application January 11, 1955, Serial No. 481,180

7 Claims. (Cl. 285—164)

This invention relates to an electric universal joint, sometimes known as a "swivel" joint, which mechanically joins two parts of an electric fixture in a fashion such as to permit relative movement therebetween about two perpendicular intersecting axes, the swivel being so constructed as internally to pass concealed flexible electric wires that conduct electric power from one to the other of the physically interconnected parts.

It is an object of my invention to provide an electric universal joint whose principal parts may be fabricated from sheet metal instead of turnings, forgings or castings.

It is another object of my invention to provide an electric universal joint, the construction of which is extremely simple so that it can be made at a low cost by mass production methods.

It is another object of my invention to provide an electric universal joint which is simple, pleasing and uncluttered in appearance.

It is another object of my invention to provide an electric universal joint which is easy to assemble.

It is another object of my invention to provide an electric universal joint having all the foregoing advantages and which does not have to be disassembled to thread electric wires therethrough.

It is another object of my invention to provide a universal joint of the character described, the operation of which cannot be impaired by being opened with ordinary handtools by well-intentioned bunglers.

It is another object of my invention to provide an electric universal joint having predetermined frictional restraint against rotation about at least one of its axes of rotation together with means for variably adding to this restraint.

It is another object of my invention to provide an electric universal joint having means to lock the same against movement around at least one of its axes of rotation.

It is another object of my invention to provide an electric universal joint which, with slight modifications, can be arranged to be coupled to different kinds of pipe or tube.

Other objects of my invention in part will be obvious and in part will be pointed out hereinafter.

My invention accordingly consists in the features of construction, combinations of elements and arrangements of parts which will be exemplified in the electric universal joints hereinafter described and of which the scope of application will be indicated in the appended claims.

In the accompanying drawings in which are shown various possible embodiments of my invention, Fig. 1 is a perspective view of an electric universal joint constructed in accordance with the present invention;

Fig. 2 is an enlarged longitudinal central sectional view taken substantially along the line 2—2 of Fig. 1;

Fig. 3 is a view similar to Fig. 2 but rotated through 90°, the same being taken substantially along the line 3—3 of Fig. 2;

Fig. 4 is a fragmentary sectional view taken substantially along the line 4—4 of Fig. 3, the same showing the friction washer which can be utilized to lock the universal joint against rotation about a transverse axis;

Figs. 5, 6, 7, 8 and 9 are perspective views of several of the components of the joint, to wit, the hood, ball, yoke, friction washer and body, respectively;

Fig. 10 is a fragmentary central sectional view through the body end of an electric universal joint embodying a modified form of my invention; and Fig. 11 is a view similar to Fig. 10 of another fixture embodying a different form of my invention.

Referring now in detail to the drawings, and more particularly to Figs. 1 through 9, the reference numeral 20 denotes an electric universal joint constructed in accordance with my invention. For the sake of convenience, the axis of rotation of the joint in the direction in which an electric wire runs therethrough will be referred to as the "longitudinal" axis. Rotation about this axis is indicated by the dot-and-dash line A. The joint also permits rotation in the direction of the dot-and-dash line B about an axis perpendicular to and intersecting the longitudinal axis and which will be referred to hereinafter as the "transverse" axis.

The joint comprises a housing which constitutes two parts, to wit, a sheet metal body 22 and a sheet metal dome 24.

The body 22 includes a tubular shank section 26, the shape of which is not critical but which conveniently may be cylindrical or frusto-conical. The lower end of the shank is inturned to form a flange 28 (Figs. 2 and 3) that is employed to secure a connecting nipple 30 in place. Said nipple is externally threaded for insertion in a tapped bore in one of the parts of an electric light fixture to be connected by the universal joint 20. The upper end of the nipple is shaped to provide an outwardly extending flange 32 which is seated on the top surface of the body flange 28. A clamping nut 34 threaded on the nipple holds the body flange 28 tightly between the nut and the nipple flange 32. The nut and nipple are so relatively proportioned that the end of the nipple extending from the nut is long enough to be threaded into a fixture part.

Pursuant to my invention, the upper end of the body 22 comprises a friction member section 36 in the shape of a surface of revolution whose axis of generation is coincident with the longitudinal axis of the shank 26. Preferably, the lower end of said friction member is smaller than the upper end of the shank 26 so that an annular shoulder, i. e. step, 38 connects these two sections of the body. The friction member 36 is so shaped that at least a portion thereof has a lesser transverse dimension than a portion remoter from the shank. Such shape is most conveniently provided by forming the friction member as a truncated cone which tapers toward the shank.

Both ends of the body 22 are open for free admission and passage of electric wires.

The dome 24 includes two sections, to wit, a second friction member section 40 and a socket section 42. The second friction member 40 is at the bottom end of the dome and provides an internal frusto-conical surface having the same taper as that of the external surface of the first friction member 36 and of about matching size. For a reason which later will be apparent, the diameter of the lower end of the internal surface of the second friction member is slightly larger than the diameter of the lower end of the external surface of the first friction member.

The socket section 42 is a surface of revolution having an axis of generation transverse to and intersecting the axis of generation of the second friction member 40. For ease of fabrication, I prefer to shape the internal surface of the socket as a hemisphere. The socket is suitably connected to the second friction member 40, e. g. by a cylindrical tubular section 44 integral with the socket and second friction member.

I form the socket with a slot 46 which runs from the top of the hemisphere to the zone connecting the hemisphere and tubular section 44 whereby the slot has an effective length of 90°. The actual length of the slot is somewhat greater to permit a full 90° oscillatory movement of a part that oscillates in said slot.

Prior to assembly of the joint, the dome has the shape shown in Fig. 5. At this time, the second friction member 40 has not yet been formed and the material of which it is to be made simply comprises an extension of the tubular section 44, being of the same diameter and indistinguishable therefrom. During assembly, and as will be explained in detail hereinafter, subsequent to insertion in the housing of the various components of the joint, the lower portion of the dome is formed, as by spinning, to take on the shape of the second friction member 40 and captively lock together the two parts of the housing, i. e. the body and the dome.

The joint includes a sheet metal yoke 46 located within the housing. Said yoke comprises a base 48 having a large central aperture 50 provided therein for free passage of electric wires. Extending upwardly from the yoke are two diverging support arms 52, 54 having upper enlarged parallel bearing ends (see Fig. 3). Said ends are suitably shaped as by piercing to provide transverse central apertures 56, 58 from which inwardly directed rings 60, 62 extend. The rings are aligned and of the same size whereby to function as trunnions.

At a point slightly below the enlarged end of the arm 52, I provide an outwardly extending tang 64 which is adapted to act as one component of a means for limiting longitudinal rotation to 360°. The other arm 54 includes a notch 66 in the periphery of the associated enlarged end, said notch being designed to function as one component of a means for variably increasing the frictional restraint against transverse rotation up to a point at which the joint is locked against such rotation.

The trunions 60, 62 are designed to support a sheet metal ball 68 for rotation about an axis transverse to and intersecting the axis of generation of the second friction member 40. Said ball includes a segment having an external configuration which matches the internal configuration of the surface of revolution constituting the socket 42. Thus, if the socket is semi-cylindrical, the external surface of the ball will comprise a cylindrical segment. If, as in the joint illustrated in the figures, the socket is hemispherical, the ball is a segment of a sphere. The bottom end of the ball is completely open and its upper end is provided with a large aperture 70 whereby to permit electric wires freely to extend therethrough.

The sides 72 of the ball are flat and parallel and are spaced apart a proper distance for slidable reception between the enlarged bearing ends of the yoke arms 52, 54. Said sides are upwardly indented to form journals 74 that rotate on the trunnions.

A male threaded nipple 76 extends through the opening 70 in the ball. Said nipple has an outwardly flanged internal end 78 that bears against the internal surface of the ball. The portion 80 of the nipple which rides in the slot 46 is non-circular and preferably includes two parallel flat side surfaces which slidably engage the sides of said slot. The nipple is suitably secured in the ball, for instance, by staking the section 80 in indentations 82 in the aperture 70. A lock nut 84 threaded on the nipple facilitates connection of the joint to an electric fixture.

To restrain relative movement of the two frictional members and relative movement of the ball and socket, I provide a single hollow resilient element such, for instance, as a helical compression spring 86. Said spring is located within the shank 26 and bears at its lower end against the flanged upper end 32 of the nipple 30. The top of the spring bears against the base 48 of the yoke.

To reduce wear, a washer 88 is interposed between the lower end of the spring and the flange 32 and a second washer 90 is interposed between the base of the yoke of the upper end of the spring. Inasmuch as in the universal joint illustrated the shank 26 flares slightly, it is desirable to include means such as clasp arms 92 for holding the top washer 90 in place centrally on the upper end of the spring.

The spring presses the ball against the socket and the ensuing friction between the mating surfaces of the ball and socket restrains free movement of the ball about the trunions 60, 62. Moreover, the force of the spring acting through the ball urges the two parts of the casing, i. e. the dome and body, longitudinally apart and, therefore, provides a frictional engagement between members 36, 40, thereby restraining free relative rotation of the two casing parts about the longitudinal axis of the joint.

Although only one spring is used, the two frictional restraints may be quite different in amount. The restraint about the longitudinal axis can be varied in the design of the joint by changing the length of the frictional members along the longitudinal axis and by varying the inclination of said members. The frictional restraint about the transverse axis can be varied by changing the diameters of the ball and the socket and by increasing the area of contact between the trunions 60, 62 and journals 74.

A tongue 94 extends upwardly from the top of the first friction member 36. As the yoke and ball turn about the longitudinal axis of the joint, the tang 64 describes a path of movement which intersects the tongue 94. Thus, said tongue forms a stop, i. e. an abutment, which prevents the two parts of the housing from turning more than 360° about the longitudinal axis.

The joint is assembled simply. The nipple is attached and the spring 86 is inserted in the body. The ball is mounted on the trunnions, the base of the yoke is placed on the upper end of the spring and the dome is slipped over the ball with the nipple 76 extending through the slot 46. The dome is moved axially toward the body to compress the spring 86 slightly more than the required extent and the lower end of the dome is spun in to form the second friction member 40. Desirably, the lower edge of the dome barely clears the shoulder 38 at the end of the spinning operation so that when the dome is pressed upwardly by spring 86, there will be a slight clearance between the shoulder 38 and the lower edge of the dome. It will be appreciated from the foregoing that after assembly in the factory, the universal joint cannot be taken apart in the field and, therefore, is fool-proof.

To use the joint, the ball is rotated until the nipple 76 is in axial alignment with the nipple 30. This provides a clear axial passageway through the joint starting with the bore in the nipple 30, then through the center of the hollow spring 86, then through the central opening in the base of the yoke, then through the hollow center of the dome, and finally through the ball and the nipple 76.

It is pointed out that the principal parts of the joint, to wit, the body, dome, yoke and ball are fabricated front sheet metal by conventional blanking, forming, spinning and drawing operations so that these parts can be made by mass production methods at a comparatively small cost. The remaining parts, to wit, the spring, the nipples and the nuts are conventional machine parts which can be purchased at low prices in the open market.

Some electric light fixtures have heavy shades, reflectors and the like which must be held in fixed position by the joint 20. These heavy parts exert a displacing torque so much greater than that of a light lampshade that is is difficult to use the same joint in all kinds of fixtures. I have overcome such difficulty by providing an auxiliary means for frictionally restraining rotation of the joint about its transverse axis, said means being so constructed that the frictional restraint can be made great enough effectively to lock the joint against transverse rotation.

The auxiliary means includes a sheet metal friction washer 96 located inside the ball flat against one of the sides 72 thereof and adjacent and in alignment with the trunnion 62 on the bearing having the notch 66.

The central opening 98 in the friction washer is tapped to admit the shank of a machine screw 100 whose head is located in the opening 58. The side of the washer 96 facing the trunnion 62 is countersunk to enable the washer to bear against the inner surface of the ball. The dome 24 is formed with an aperture 102 in line with the head of the screw 100 and sufficiently large to permit a tip of a screwdriver blade to reach the screw. By slowly turning the screw 100, the frictional restraint added by the washer 96 can be gradually raised or lowered as desired and if the screw is turned far enough, the ball is locked against rotation about the transverse axis.

To prevent the washer from turning about the trunnion when the screw is rotated, a finger 104 is provided on the washer, said finger extending outwardly into the notch 66.

In Fig. 10, I have shown an electric universal joint 20' which is the same as the joint 20 except for a variation which permits coupling with a non-threaded male element of an electric fixture rather than a threaded female element. In lieu of the nipple 30, a ferrule 106 is inserted in the shank 26'. The upper end of the ferrule has a flange 108 which frictionally engages the inner wall of the shank. The shank and ferrule are formed with registered tapped holes 110, 112 that admit a set screw 114 which functions both to retain the ferrule in place and to engage an unthreaded male element 116 inserted through the lower open end of the shank.

The construction shown in Fig. 10 can be modified for use with a threaded male element as illustrated in Fig. 11. The reference numeral 20" denotes an electric universal joint similar to the joint 20'. Said joint 20" includes a ferrule 106" which is internally threaded to receive the threaded end of a pipe 116". The ferrule 106" is firmly held in place by frictional engagement between its end flanges and the internal surface of the body 26" as well as by a set screw 114" which is threaded in registered tapped openings in the body and ferrule and is adapted to engage the pipe 116".

It thus will be seen that I have provided electric universal joints which achieve all the objects of my invention and are well adapted to meet the conditions of practical use.

As various possible embodiments might be made of the above invention and as various changes might be made in the embodiments above set forth, it is to be understood that all matter herein described or shown in the accompanying drawings is to be interpreted as illustrative and not in a limiting sense.

Having thus described my invention, I claim as new and desire to secure by Letters Patent:

1. A universal joint comprising a first hollow one-piece sheet metal member having at an end thereof a frustoconical divergent friction surface, a second hollow one-piece sheet metal member having a second frustoconical convergent friction surface in which the first friction surface is nested, said members defining a housing, a third one-piece sheet metal member located within the second member, said second member also having a hemispherical friction surface, said third member having a second hemispherical friction surface nested in the first hemispherical friction surface, a fourth sheet metal one-piece yoke member located within said first and second members, said yoke member having means coacting with the third member to support the third member for rotation about an axis perpendicular to and intersecting the axis of symmetry of the first and second friction surfaces, a hollow elastic member located within said housing and held under compression between said first and yoke members whereby to create frictional restraints against relative movement of said two frustoconical friction surfaces and said two hemispherical friction surfaces, said second member having a slot in its hemispherical friction surface perpendicular to the axis of rotation of the third member, said third member having an opening in the plane of said slot, and a hollow open-ended tubular element secured to said third member in alignment with said opening and extending through said slot, said slot having a portion intersected by the axis of symmetry of the frustoconical friction surfaces.

2. A universal joint comprising a hollow first member, a hollow second member, said members defining a housing, said first member having at an end thereof a first friction surface constituting a surface of revolution, said second member having at an end thereof a second friction surface constituting a surface of revolution which matches the first surface of revolution, one of said friction surfaces being nested in the other, a third member, said third member being located within said second member, the outer friction surface extending convergently away from its associated member and the inner friction surface extending divergently away from its associated member, said second member including a third friction surface constituting a surface of revolution having an axis of generation transverse to and intersecting the axes of generation of the first and second surfaces of revolution, said third member having a fourth friction surface constituting a surface of revolution matching the third friction surface, said fourth friction surface being nested in said third friction surface, a hollow elastic member located within said housing and held under compression between said first and third members whereby to create frictional restraints against relative movements of said first pair of friction surfaces and of said second pair of friction surfaces, said second member having a slot in the third friction surface in a plane perpendicular to the axis of generation of said third surface, said third member having an opening in the plane of said slot, a hollow open-ended tubular element secured to said third member in alignment with said opening and extending through said slot, said slot having a portion intersected by the axis of generation of the first pair of friction surfaces, and means for variably adding to the frictional restraints against relative movement of one of said pair of friction surfaces.

3. A universal joint comprising a sheet metal body having a frustoconical friction surface at one end thereof and an internal abutment at the other end, a sheet metal dome having a frustoconical friction surface at one end thereof and a hemispherical friction surface at its other end, one of the said frustoconical surfaces being nested in the other, a sheet metal ball in said dome having a hemispherical friction surface nested in the hemispherical friction surface of the dome, a yoke in the body and dome, said yoke including a base and a pair of arms, said arms having means mounting the ball for rotation about an axis perpendicular to and intersecting the axis of symmetry of the frustoconical surfaces, said dome having a slot in a plane perpendicular to the axis rotation of the ball, said ball having an opening in the plane of said slot, a hollow open-ended tubular element secured to the ball in alignment with the opening and extending through the slot, said slot having a portion intersected by the axis of symmetry of the frustoconical friction surfaces, and a coil spring under compression between the abutment in the body and the base of the yoke, the base of said yoke having an opening in alignment with the coil of the spring.

4. A universal joint as set forth in claim 3 wherein a friction drag member is provided, said member frictionally and slidably engaging the ball and being adjustably carried by the yoke.

5. A universal joint as set forth in claim 3 wherein a friction nut is provided, said nut frictionally and slidably engaging the ball and being carried by a screw from the yoke whereby the frictional restraint against a relative movement of the ball and dome can be adjustably increased up to a point where said ball and dome are locked together.

6. A universal joint as set forth in claim 3 wherein an arm of the yoke is apertured, wherein a friction nut is provided, and wherein a screw extends through the aperture in said arm and carries said nut, said nut frictionally and slidably engaging the ball whereby the degree of friction between the yoke and ball can be varied by adjustment of the screw, said dome having an opening in alignment with the screw for access thereto.

7. A universal joint as set forth in claim 3 wherein the ball is provided with notches having circular bottoms and wherein the yoke is provided with trunnions journaled in said notches for rotatably mounting the ball.

References Cited in the file of this patent

UNITED STATES PATENTS

| | | |
|---|---|---|
| 169,342 | Cushing | Nov. 2, 1875 |
| 462,621 | Carey | Nov. 3, 1891 |
| 1,160,639 | Mooney | Nov. 16, 1915 |
| 1,166,752 | Finizio | Jan. 4, 1916 |
| 1,285,291 | McLaughlin | Nov. 19, 1918 |
| 1,469,528 | Owens | Oct. 2, 1923 |
| 1,798,121 | Jackes | Mar. 24, 1931 |
| 2,316,069 | Hocher | Apr. 6, 1943 |
| 2,362,100 | Schwartz | Nov. 7, 1944 |

FOREIGN PATENTS

| | | |
|---|---|---|
| 237,927 | Great Britain | Dec. 6, 1926 |